Aug. 22, 1961  C. H. PRIESMEYER  2,997,239
THERMOSTATIC MIXING VALVE
Filed April 21, 1958  2 Sheets-Sheet 2
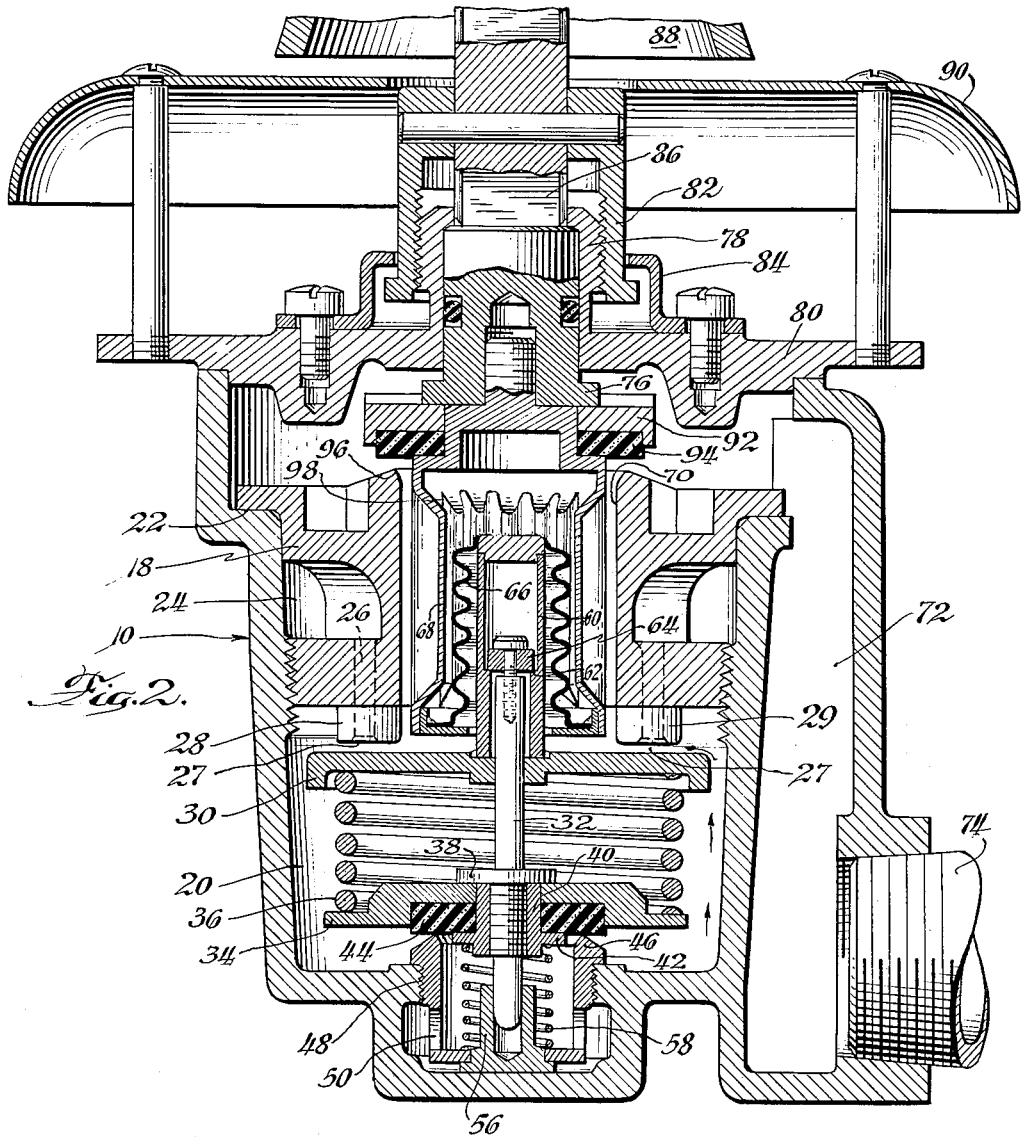
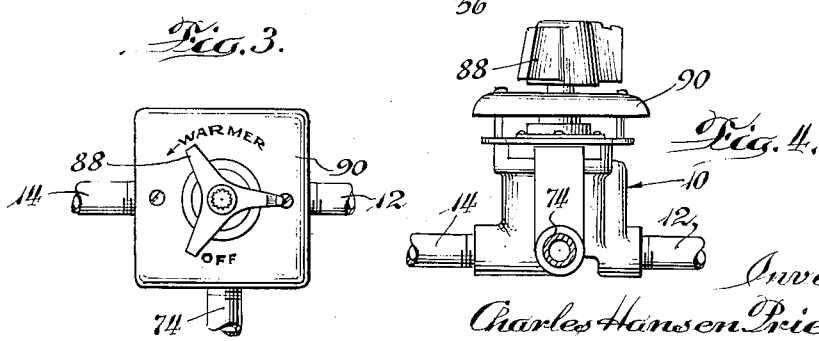
Inventor:
Charles Hansen Priesmeyer
By Byron, Hume, Groen & Clement
Attorneys.

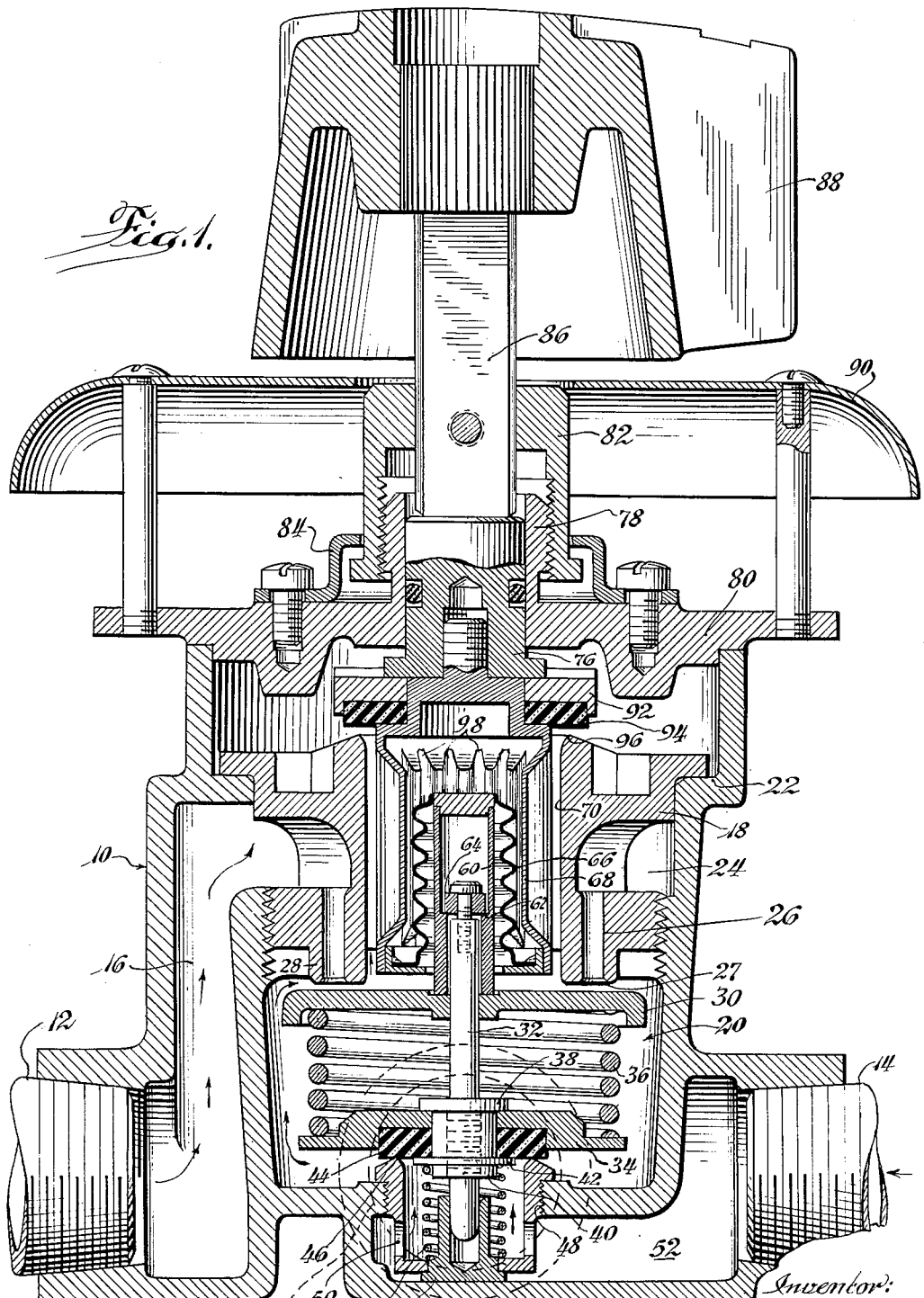

2,997,239
Patented Aug. 22, 1961

2,997,239
THERMOSTATIC MIXING VALVE

Charles Hansen Priesmeyer, Wilmette, Ill., assignor to The Powers Regulator Company, Skokie, Ill., a corporation of Illinois
Filed Apr. 21, 1958, Ser. No. 729,957
3 Claims. (Cl. 236—12)

This invention in its broadest aspect relates to a mixing valve especially suited for mixing hot and cold water to obtain water of a desired temperature.

Mixing valves have long been used in the installation of plumbing systems for residential buildings. Such valves, in order to be suitable for residential construction, must be substantially accurate in maintaining the selected proportions of hot and cold water mixed and at the same time must be relatively inexpensive. Heretofore, it has been the practice to use one or more sleevetype valves in the construction of the mixing valve for controlling the flow from the hot and cold water sources. Such valves are relatively accurate if the various parts used in their construction are machined to close tolerances. However, in order to achieve the desired accuracy, it is necessary to employ expensive machining and other fabricating techniques in constructing the valve. Accordingly the sleevetype mixing valves were generally unsuitable for residential use due to their expensive nature. Other types of valves have been designed in order to eliminate the expense of the sleevetype valve but these have generally not met the requirement of accuracy. Accordingly, one of the foremost features and objects of this invention is to provide an improved mixing valve that is substantially accurate and at the same time is relatively inexpensive.

Another object of the invention is to provide a mixing valve that will thermostatically adjust for depletions in the fluid flowing from either the hot or cold inlet.

Another object of the invention is to provide a mixing valve that is resistant to the formation of lime deposits normally encountered as the result of water.

A still further object of the invention is to provide a mixing valve that is especially suited for residential use as well as many other purposes.

A still further object of the invention is to provide a mixing valve in which the hot and cold water inlets may be completely and selectively opened and closed so that the temperature of the water flowing from the valve may be varied between and including the hot water temperature and cold water temperature.

A still further object of the invention is to provide a mixing valve of a relatively simple construction which may be easily maintained and operated.

These and other objects of the invention will be apparent upon reading of the specification, with reference to the following drawings:

In the drawings:

FIGURE 1 is a cross-sectional view of the mixing valve embodying the invention.

FIGURE 2 is a cross-sectional view taken at right angles to the view shown in FIGURE 1.

FIGURE 3 is a front view in elevation of the mixing valve when installed.

FIGURE 4 is a side view in elevation of the mixing valve when installed.

Referring now to FIGURES 1 and 2, the mixing valve is comprised of a casing generally denoted by the numeral 10 which has the inlet ports 12 and 14. The inlet ports 12 and 14 are adapted to be connected to a source of cold water (not shown) and a source of hot water (not shown), respectively.

After entering the inlet port 12, the cold water flows through the passage 16 into association with a nylon sleeve 18. The sleeve 18 is preferably constructed of nylon, although other suitable materials may be used. It has been found that nylon, and particularly in this construction, is resistant to the effects of liming and other deposit forming tendencies of the water flowing through the valve. The nylon sleeve 18 is secured in place by the threaded portion of the chamber 20 and is adapted to seat on the shoulder 22 of the casing 10. An annular groove 24 extends around the external periphery of the sleeve 18 and is in association with the passage 16 so that the cold water flows around the groove as can be seen from the drawings. A plurality of orifices 26 are spaced about the annular groove 24 and connect it with the chamber 20. The orifices 26 provide a total flow area so that when unrestricted, there is substantially undiminished flow from the inlet 12 into the chamber 20. On the lower face of the sleeve member 18 a valve seat 27 is formed in association with each one of the orifices 26 in the form of a boss 28. Between the bosses 28 are the spaces 29, as best shown in FIGURE 2, for permitting flow therebetween.

A valve plate 30 is slidably mounted on the stem 32 and is adapted to seat on the valve seats 27 when in its uppermost position so as to close off the orifices 26. This particular construction forms what is commonly called, by the trade, a poppet valve. The valve plate 30 is maintained in spaced relation by the coil spring 36 from a second valve plate 34 which is fixedly mounted on the valve stem 32 and also forms a poppet type valve. The valve plate 34 when assembled is held in abutting position against the collar 38 by the threaded sleeve 40 and collar 42 extending therefrom. A sealing member 44 constructed of some suitable sealing material such as rubber is sandwiched in between the collar 42 and the underside of the plate 34. The sealing ring 44 is adapted to seat on the valve seat 46 when the valve plate 34 is in its lowermost position so as to prevent the flow of water from the inlet port 14.

As shown in the drawing, the valve seat 46 is of a cup-like construction and is threadably received in the aperture 48 in the bottom of the chamber 20. The valve seat 46 is provided with a plurality of passages 50 which connect it and the chamber 20 with the chamber 52 leading from the inlet 14. A sleeve member 56 extends upwardly from the bottom of the valve seat 46 and provides a guide means for the lower end of the stem 32. A coil spring 58 extends between the bottom of the valve seat 46 and the collar 42 so as to bias the plate 34 toward the open position.

The upper end of the stem 32 has a sleeve member 60 slidably mounted thereon and which rests on the valve plate 30. The shoulder 62 of the sleeve member 60 is adapted to engage a collar 64 secured to the end of the stem 32. As a result of this arrangement, the coil spring 36 disposed between the plates 30 and 34 will normally cause the sleeve 60 to be positioned so that the shoulder 62 is in abutment with the collar 64 as shown in the drawings.

The sleeve 60 is encompassed by a bellows member 66 which is in turn disposed within the motor 68. The motor 68 is in the form of a fluted generally cylindrical member closed at its ends and filled with an expansible charge material and is generally positioned in the passageway 70 in the sleeve member 18. The upper end of the passageway 70 communicates with the chamber 72 which in turn is connected with the outlet port 74 as best shown in FIGURE 2.

The upper end of the motor 68 is in abutting relationship with the cap 76 and is threadably secured thereto. The cap is slidably disposed in the aperture 78 in the cover plate 80 which is secured to the casing 10 by bolt members (not shown) disposed at the corners thereof. An internally threaded cap 82 is secured to the aperture 78 and is held in its assembled position by the stop members 84 which in turn are bolted to the cover plate 80, as shown in FIGURES 1 and 2. A threaded stem 86 extends through the cap member 82 and may be vertically adjusted by rotation thereof. An indicator knob 88 is secured to the exposed end of the stem 86 for facilitating rotation thereof, and is adapted to co-operate with suitable indicia on the plate 90 for indicating the relative temperature of the water, as best shown in FIGURE 3.

The cap 76 is held in abutment with the stem 86 so that movement of the stem 86 along its longitudinal axis will cause a like adjustment of the cap 76. The movement of the cap 76 in turn causes movement of the motor 68 which movement in turn will be transferred to the sleeve 60 by the charge within the motor. Since the sleeve 60 abuts the plate 30, the latter will also move against the force of the spring 36, so as to open or close the orifices 26.

A disk member 92 and a resilient seal 94 are sandwiched between the cap 76 and the upper end of the motor 68 so as to be held in fixed relationship therewith to form a poppet type valve. When the cap 76 and the motor 68 are in their lowermost position, the sealing member 94 is seated on the valve seat 96 on the sleeve member 18. Thus, when the stem is in its lowermost position, there is no flow from either of the inlets 12 or 14 to the outlet 74.

When the stem 86 is in a particular position of adjustment, the sleeve 60 is designed to be moved by expansion or contraction of the charge in the motor 68 through the medium of the bellows 66 which encompasses the sleeve. Liquid flowing through the passageway 70 will cause the temperature of the charge in the motor 68 to vary in accordance with the temperature of the liquid. This effect is enhanced by the fluted construction of the outer surface of the motor 68, such flutes being identified by the numeral 98. The movement of the sleeve 60 relative to the motor 68 will cause the plate 30 to be moved relative to the valve seats 27. If the seal 44 is not in abutment with the valve seat 46, such movement of the plate 30 will also cause movement of the plate 34 through the spring 36. The actual operation of this device will now be described.

When the stem 86 is in its lowermost position, the seal 94 is in sealing engagement with the valve seat 96 so that there will be no flow of liquid through the passage 70 into the chamber 72 and out the outlet 74. The plate 30 will be positioned away from the valve seats 27, as shown in the drawing, so that the passage 70 is in communication with the inlet 12 which is preferably connected to a source of cold water.

When the stem 86 is moved slightly upward, the plate 30 will still be spaced from the valve seats 27 so that water from the inlet 12 can flow through the passage 70 into the chamber 72 and out through the outlet 74. The sealing member 44 will still be held in engagement with the valve seat 46 by the coil spring 36 so that there is no flow from the inlet 14.

As the stem 32 is moved further upward, the seal 44 will be lifted from the valve seat 46 so that hot water will be permitted to flow from the inlet 14 through the passage 70 into the chamber 72 and out the outlet 74. When the stem 86 is in an intermediate position, there will be flow from both the cold water inlet 12 and the hot water inlet 14 through the outlet 74. If the valve stem 86 is moved to its uppermost position, the plate 30 will then be in sealing engagement with the valve seats 27 so that there is no flow from the inlet 12 through the passage 70. There will be flow, however, from the inlet 14 through the chamber 20, between the bosses 28, into the passage 70, into the chamber 72 and out the outlet 74.

It should be pointed out that during normal operation, that is, when hot and cold water are being mixed, the spring 36 merely holds the plates 30 and 34 in a fixed relationship against the shoulders on the valve stem 32. The spring 58 holds the valve stem 32 and the entire valve assembly firmly against the bellows head through the sleeve 60 so that the valve assembly follows the movement of the bellows.

Assuming that there is flow from both inlets 12 and 14 so that there is a mixture of hot and cold water flowing past the motor 68 in the passage 70, any increase in the temperature of the water in the passage 70 will cause the charge in the motor 68 to expand. The expansion of the charge will restrict the bellows 66 and cause the sleeve 60 to move downwardly, which in turn will cause the plates 30 and 34 to be moved downwardly. In this manner the cold water is increased and the hot water is decreased so as to compensate for any sudden increase in the temperature of the water. Conversely, if the temperature of the liquid flowing in the passageway 70 drops, the charge in the motor 68 will contract so that the bellows 66 will expand. The plates 30 and 34 will then be moved upwardly so as to increase the flow of hot water and decrease the flow of cold water. In this manner any decrease in temperature will be compensated for by the thermostatic adjustment of the valve.

It can now be seen that the mixing valve as described is particularly adapted for residential use in shower installations and the like. By utilizing a poppet valve type construction in the design of the mixing valve, it is possible to eliminate the expense associated with the prior sleeve and piston type valves. At the same time the construction as described in the specification provides a valve that is accurate to such a degree that it is suitable for residential use. The valve is also provided with a means for selectively shutting off either the hot or cold water and at the same time allowing the other to remain open. In this manner it is possible to provide a flow from the outlet 74 at any temperature intermediate the extremes of the hot and cold water.

It should be pointed out that the mixing valve may be shut off even though the motor 68 should become inoperative. For example, if the expansible charge should escape from the motor, the resilient disk 94 could still be moved downwardly by rotation of the valve stem 86 until it is seated on the valve seat 96, thus stopping all flow through the valve.

Although a preferred embodiment of the invention has been disclosed in the specification, it is to be understood that this is merely by way of example and in no manner is to be construed as a limitation. It is contemplated that certain modifications may be made within the scope of the claims without departing from the spirit of the invention.

I claim:

1. A valve for mixing hot and cold water and adapted to be connected to a source of cold water and a source of hot water, comprising a casing having a first inlet for connecting to a source of cold water, a second inlet for connecting to a source of hot water, and an outlet, a chamber within said casing for mixing said hot and cold water, a sleeve member having an external annular groove communicating with said first inlet, said sleeve member conveying the mixed water from said chamber to said outlet, a plurality of orifices spaced about said annular groove communicating with said chamber, a passage means for connecting said chamber to said second inlet, a first poppet valve plate co-operating with said sleeve for controlling the flow through said orifices, a second poppet valve for controlling the flow from said second inlet, a thermal motor mounted for relative movement within said sleeve member for sensing the temperature of the water flowing through the latter, said thermal motor including an expansible charge and bellows means, said bellows means moving said first and second valves toward the opened and closed positions and vice versa in response to expansion and contraction of said expansible charge, third poppet valve means co-operating with said sleeve member for controlling the flow from said chamber to said outlet, and means for selectively opening and closing said first, second, and third valves.

2. A valve adapted to be connected to sources of hot and cold water for mixing the same at a selected ratio comprising a casing having first and second inlets for connecting said casing to said sources of hot and cold water, and an outlet through which the mixed water is discharged from said casing, a sleeve member fixedly mounted within said casing with one end thereof co-operating with said casing to define a chamber for mixing the water from said first and second inlets and connecting said chamber to said outlet, said sleeve member having an outwardly facing annular groove communicating with one of said inlets, a plurality of orifices spaced about said annular groove communicating with said chamber through said one end of said sleeve member, passage means for connecting said chamber to the other of said inlets, a first poppet valve cooperating with said one end of said sleeve member for controlling the flow from said orifices into said chamber, a second poppet valve for controlling the flow from said other inlet to said chamber, a thermal motor positioned within said sleeve member for axial movement relative thereto and adapted to sense the temperature of the mixed water flowing through said sleeve member from said chamber to said outlet, said thermal motor including an expansible charge and a bellows, said bellows connected to said first and second poppet valves for moving them between their opened and closed positions in response to the expansion and contraction of said expansible charge, a third poppet valve cooperating with the other end of said sleeve member for controlling the flow therefrom to said outlet, and manual means for selectively opening and closing said first, second and third poppet valves.

3. A valve adapted to be connected to sources of hot and cold water for mixing the same at a predetermined ratio comprising a casing having first and second inlets for connecting said casing to said sources of water, and an outlet through which the mixed water is discharged from said casing, said casing defining a substantially cylindrical cavity, a sleeve member coaxially mounted within said cavity with the outer wall thereof in touching relationship with said casing, one end of said sleeve member cooperating with said casing to form a chamber extending for an axial portion of said cavity for mixing water from said first and second inlets, said sleeve member connecting said chamber to said outlet and having an outwardly facing annular groove communicating with one of said inlets, a plurality of orifices spaced about said annular groove communicating with said chamber through said one end of said sleeve member, a valving orifice coaxial with said sleeve member for connecting said chamber to the other of said inlets, a stem member mounted coaxial with said sleeve member, a first poppet valve slidably mounted on said stem member adjacent said one end of said sleeve member for controlling the flow from said orifices into said chamber, a second poppet valve fixedly mounted on said stem adjacent said valving orifice for controlling the flow therefrom into said chamber, spring means mounted intermediate said first and second poppet valves for biasing the former away from the latter, means for limiting the movement of said first poppet valve away from said second poppet valve, a thermal motor positioned within said sleeve member for axial movement relative thereto and adapted to sense the temperature of the mixed water flowing through said sleeve member from said chamber to said outlet, said thermal motor including an expansible charge and a bellows, said bellows connected to said first and second poppet valves for moving the same between their opened and closed positions in response to the expansion and contraction of said expansible charge, a third poppet valve cooperating with the other end of said sleeve member for controlling the flow from said chamber to said outlet, and manual means for selectively opening and closing said first, second and third poppet valves.

References Cited in the file of this patent

UNITED STATES PATENTS

| 1,348,589 | Seeger | Aug. 3, 1920 |
| 1,611,650 | Lawler | Dec. 21, 1926 |
| 2,442,886 | Bowen | June 8, 1948 |
| 2,657,859 | Von Wangenheim | Nov. 3, 1953 |
| 2,826,367 | Cobb | Mar. 11, 1958 |
| 2,828,075 | Panza | Mar. 25, 1958 |

FOREIGN PATENTS

| 514,326 | Great Britain | Nov. 6, 1939 |